United States Patent
Liu et al.

(10) Patent No.: US 9,049,131 B2
(45) Date of Patent: Jun. 2, 2015

(54) NETWORK SYSTEM AND LOAD BALANCING METHOD

(71) Applicants: Inventec (Pudong) Technology Corporation, Shanghai (CN); INVENTEC CORPORATION, Taipei (TW)

(72) Inventors: Te-Yen Liu, Taipei (TW); Chien-Chih Lin, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 208 days.

(21) Appl. No.: 13/792,230

(22) Filed: Mar. 11, 2013

(65) Prior Publication Data

US 2014/0140210 A1    May 22, 2014

(30) Foreign Application Priority Data

Nov. 20, 2012 (CN) .......................... 2012 1 0470119

(51) Int. Cl.
*H04L 12/26* (2006.01)
*H04L 12/801* (2013.01)

(52) U.S. Cl.
CPC ...................................... *H04L 47/12* (2013.01)

(58) Field of Classification Search
None
See application file for complete search history.

(56) References Cited

U.S. PATENT DOCUMENTS

| | | | |
|---|---|---|---|
| 6,671,724 B1 * | 12/2003 | Pandya et al. | 709/226 |
| 6,678,245 B1 * | 1/2004 | Cooper et al. | 370/230 |
| 2004/0103193 A1 * | 5/2004 | Pandya et al. | 709/224 |
| 2004/0153545 A1 * | 8/2004 | Pandya et al. | 709/226 |

* cited by examiner

*Primary Examiner* — Donald Mills
(74) *Attorney, Agent, or Firm* — CKC & Partners Co., Ltd.

(57) ABSTRACT

The load balancing method includes: receiving identify information of the nodes to construct a network topology diagram and receiving support rates of connection ports through a controller; monitoring average data rates of the connection ports through the controller; when the average data rate of one of the connection ports is in excess of a congestion criteria, searching a packet flow with the highest data rate among packet flows passing through the connection port of which the average data rate is in excess of the congestion criteria through the controller; and performing a shortest path first algorithm according to the packet flow with the highest data rate and the network topology diagram, wherein the computed connection ports do not include the connection port of which the average data rate is in excess of the congestion criteria; and a new transmitting path is acquired.

10 Claims, 2 Drawing Sheets

NETWORK SYSTEM AND LOAD BALANCING METHOD

RELATED APPLICATIONS

This application claims priority to Chinese Application Serial Number 201210470119.6, filed Nov. 20, 2012, which is herein incorporated by reference.

BACKGROUND

1. Field of Invention

The present invention relates to an electronic system and a load balancing method. More particularly, the present invention relates to a network system and a load balancing method.

2. Description of Related Art

With the rapid development of information technology, the networks of various forms, such as local area networks, Internets, data center networks and the like, have already been applied widely in people's daily life.

Some networks (e.g. the data center networks) are mostly provided with redundancy links in order to prevent the failure of packet transmission caused by the failure of a single link. In order to fully utilize the bandwidths of the network, the current technique may adopt an equal cost multiple path routing method, so as to evenly distribute the data rates of the networks to all the links. However, a congestion problem generally exists in the networks. That is, the amount of data transmitted on a specific link is too large, which approaches the support rates of corresponding connection ports, so that as the nodes fail to process the data timely, the data is lost or delayed. The current equal cost multiple path routing method has no a mechanism for solving or preventing congestion. Therefore, how to design a load balancing method to reduce the data transmission amount on the specific links during or before the congestion thereof to prevent the data loss or delay and further promote the reliability of the networks is an important topic for the network technique.

SUMMARY

An aspect of the present invention provides a load balancing method. The load balancing method is forwarding a packet flow with the highest data rate in a connection port to other paths when the average data rate of any connection port of nodes (such as, a switch or a router) in a network system is in excess of a congestion criteria.

According to an embodiment of the present invention, the load balancing method is applied to a network system. The network system includes a plurality of nodes and a controller. Each of the plurality of nodes includes at least one connection port. Every two adjacent nodes are connected through the connection ports to form a plurality of links. The load balancing method includes following steps: respectively transmitting identify information of the plurality of nodes and a support rate of the at least one connection port of the plurality of nodes to the controller through the plurality of nodes; receiving the identify information to construct a network topology diagram and receiving the support rate of the at least one connection port of the plurality of nodes through the controller; monitoring an average data rate of the at least one connection port of the plurality of nodes through the controller; when the average data rate of one of the at least one connection port of the plurality of nodes is in excess of a congestion criteria, searching a packet flow with the highest data rate among the plurality of packet flows passing through the at least one connection port of which the data rate is in excess of the congestion criteria through the controller; performing a shortest path first algorithm according to the packet flow with the highest data rate and the network topology diagram through the controller, wherein the computed connection ports do not include the connection port of which the average data rate is in excess of the congestion criteria; and acquiring a new transmitting path through the controller.

According to an embodiment of the present invention, the step of performing the shortest path first algorithm through the controller includes: searching a plurality of candidate paths for the packet flow with the highest data rate according to the packet flow with the highest data rate and the network topology diagram through the controller; calculating path costs of the plurality of candidate paths through the controller; and searching one of the plurality of candidate path with the lowest path cost from the plurality of candidate paths through the controller.

According to an embodiment of the present invention, the load balancing method further includes: searching a source node and a destination node of the packet flow with the highest data rate, and an original path between the source node and the destination node through the controller; writing at least one packet forwarding rule into at least one forwarding table of at least one of the nodes passed by the new transmitting path separately through the controller; and deleting at least one packet forwarding rule corresponding to the original path from at least one forwarding table of at least one of the nodes passed by the original path through the controller.

According to an embodiment of the present invention, the load balancing method further includes: when the average data rate of one of the at least one connection port of the plurality of nodes is in excess of the congestion criteria, calculating costs of the plurality of links according to the average data rates of the at least one connection port of the plurality of nodes and the support rates of the at least one connection port of the plurality of nodes through the controller. The step of performing the shortest path first algorithm according to the packet flow with the highest data rate and the network topology diagram through the controller includes performing the shortest path first algorithm to plan out the new transmitting path through the controller, wherein weights of the shortest path first algorithm are the costs of the plurality of links.

According to an embodiment of the present invention, the step of monitoring the average data rates of the at least one connection port of the plurality of nodes includes: receiving a first cumulative data of one of the at least one connection port of one of the plurality of nodes at a first time point through the controller; receiving a second cumulative data of the one of the at least one connection port of the one of the plurality of nodes at a second time point through the controller; and dividing the difference between the first cumulative data and the second cumulative data by the difference between the point and the second time point, so as to obtain one of the average data rates of the one of the at least one connection port of the one of the plurality of nodes through the controller.

Another aspect of the present invention provides a network system. The network system can utilize the controller to monitor the average data rates of the connection ports of the plurality of nodes in the network system. Furthermore, when the average data rate of any connection port is in excess of a congestion criteria, the controller of the network system forwards the packet flow with the highest data rate in a connection port to other paths.

According to an embodiment of the present invention, the network system includes a plurality of nodes and a controller.

Each of the plurality of nodes includes at least one connection port. Every two adjacent nodes are connected through the connection ports to form a plurality of links. The plurality of nodes are used for respectively outputting identify information of the plurality of nodes and a support rate of the at least one connection port of the plurality of nodes. The controller is used for receiving the identify information to construct a network topology diagram, receiving the support rates of the at least one connection port of the plurality of nodes, and monitoring an average data rates of the at least one connection port. When the average data rate of one of the at least one connection port of the plurality of nodes is in excess of a congestion criteria, the controller searches a packet flow with the highest data rate from the plurality of packet flows passing through the at least one connection port of which the average data rate is in excess of the congestion criteria. The controller performs a shortest path first algorithm according to the packet flow with the highest data rate and the network topology diagram to acquire a new transmitting path. The computed connection ports do not include the connection port of which the average data rate is in excess of the congestion criteria.

According to an embodiment of the present invention, the controller is further used for searching a plurality of candidate paths for the packet flow with the highest data rate according to the packet flow with the highest data rate and the network topology; calculating path costs of the plurality of candidate paths, and searching one of the plurality of candidate path with the lowest cost from the plurality of candidate paths as the new transmitting path.

According to an embodiment of the present invention, the controller is further used for searching a source node and a destination node of the packet flow with the highest data rate, and an original path between the source node and the destination node. Furthermore, the controller writes at least one packet forwarding rule into at least one forwarding table of at least one of the plurality of nodes passed by the new transmitting path separately, and deletes at least one packet forwarding rule corresponding to the original path from at least one forwarding tables of at least one of nodes passed by the original path.

According to an embodiment of the present invention, when the average data rate of the at least one connection port of the plurality of nodes is in excess of the congestion criteria, the controller is further used for calculating the costs of the plurality of links according to the average data rates of the at least one connection port of the plurality of nodes and the support rates of the connection ports and performing the shortest path first algorithm to plan out the new transmission path, wherein weights of the shortest path first algorithm are the costs of the plurality of links.

According to an embodiment of the present invention, the controller is further used for receiving a first cumulative data of one of the at least one connection port of the plurality of nodes of one of the plurality of nodes at a first time point; receiving a second cumulative data of the at least one connection port of the one of the plurality of nodes at a second time point; and dividing the difference between the first cumulative data and the second cumulative data by the difference between the first time point and the second time point, so as to obtain one of the average data rates of the one of the at least one connection port of the one of the plurality of nodes.

In view of the above, through the application of one of the embodiments above, a loading balancing method can be realized. For this loading balancing method, by monitoring the data rate of each of the connection points, when the average data rate of any connection port is in excess of a congestion criteria, the packet flow with the highest data rate in the connection port can be forwarded to other paths. In addition, through the application of one of the embodiments above, the packet flow with the highest data rate mentioned above can be forwarded to the path with the lowest cost through a method of calculating the path cost according to the support rate and the average data rate of the connection port.

DETAILED DESCRIPTION

The spirit of the disclosure will be described clearly in the following detailed description with reference to the drawings. After learning the embodiments of the disclosure, those of skills in the art can make variations and modifications with reference to the technology taught in the disclosure, without departing from the sprite and scope of the disclosure.

The phrases "first", "second" and the like used herein do not specifically indicate the order or sequence, as well as not being used for limiting the present invention, and is only used for distinguishing elements or operations described with the same technical terms.

An implementing aspect of the present invention provides a network system. The network system can utilize a controller to monitor the average data rates of connection ports of nodes (e.g., a switch or a router) in the network system. Furthermore, when the average data rate of any connection port is in excess of congestion criteria, a packet flow with the highest data rate in the connection port is forwarded to other paths.

The so-called packet flow herein refers to a plurality of continuous or discontinuous packets in the network system, which have the same features, such as the same source address, destination address, source port number of the application layer and/or destination port number of the application layer. The source address and the destination address, for example, are Internet protocol (IP) addresses and/or media access control (MAC) addresses.

Figure 1:
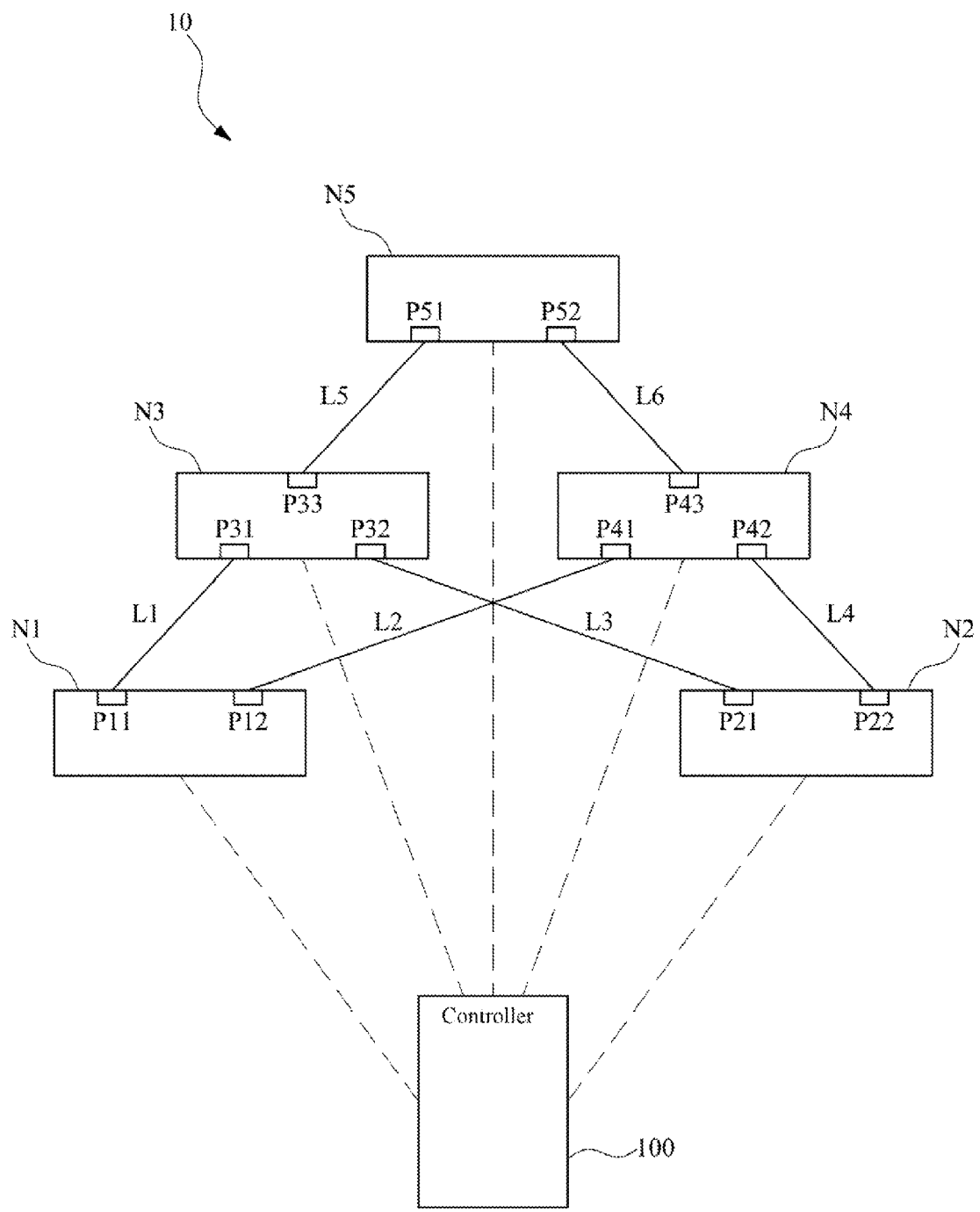
FIG. 1 is a schematic diagram of a networks system illustrated according to an embodiment of the present invention.

FIG. 1 is a schematic diagram of a network system 10 illustrated according to an embodiment of the present invention. The network system 10 includes a controller 100 and a plurality of nodes, for example N1-N5. Each of the nodes N1-N5 includes at least one connection port. For example, the node N1 includes connection ports P11 and P12. The node N2 includes connection ports P21, P22 and the like. The controller 100 is connected with each of the nodes N1-N5. Every two adjacent ones of the nodes N1-N5 are connected through the corresponding connection port to form a link. For example, the node N1 and the node N3 are connected through the connection ports P11 and P31 to form a link L1. The node N1 and the node N4 are connected through the connection ports P12 and P41 to form a link L2. The so-called adjacent nodes herein refer to two nodes which can be connected with each other through a single link. Additionally, the nodes N1-N5 mentioned above may be an OpenFlow switch or router, and the controller mentioned above may be an OpenFlow controller.

In this embodiment, the controller 100, for example, is a computer. The controller 100 can send an instruction to the nodes N1-N5 to instruct the nodes N1-N5 to respectively output identify information of the nodes N1-N5 and the support rates of the connection ports P11-P52 of the nodes N1-N5 to the controller 100. Next, the controller 100 can receive the identify information of the nodes N1-N5 to construct a network topology diagram corresponding to the network system 10 and can receive the support rates of the connection ports P11-P52 of the nodes N1-N5. The network topology diagram may refer to the connection relation between the nodes N1-N5. In practical, the controller 100 can instruct the nodes N1-N5 to broadcast a link layer discovery protocol (LLDP) packet to the adjacent nodes N1-N5, to make the adjacent nodes N1-N5 exchange the identify information of themselves with each other. Subsequently, the controller 100 can send another instruction to the nodes N1-N5 to make the nodes N1-N5 pass the identify information of the adjacent nodes N1-N5 hack to the controller 100. As such, the controller 100 can know the network topology diagram corresponding to the network system 10 via the identify information of the nodes N1-N5. Additionally, the controller 100 also can make the nodes N1-N5 transmit the support rates of the connection ports P11-P52 via sending instructions to the nodes N1-N5.

Furthermore, the controller 100 can monitor the average data rates of the connection ports P11-P52. For example, instructions can be periodically sent to the nodes N1-N5 so that the nodes N1-N5 transmit the cumulative data of the connection ports P11-P52 to the controller 100. The controller 100 then calculates the average data rates according to the cumulative data.

When finding out that the average data rate of any one of the connection ports P11-P52 is in excess of a congestion criteria, the controller 100 can search a packet flow with the highest data rate from the packet flows passing through the one of the connection ports P11-P52 of which the average data rate is in excess of the congestion criteria. The packet flow with the highest data rate can be defined by a manager according to actual conditions, for example, but not limited to, the packet flow with the highest average data rate for a period of time.

After the packet flow with the highest data rate is searched, the controller 100 can perform a shortest path first algorithm according to the packet flow with the highest data rate and the network topology diagram corresponding to the network system 10. The connection ports P11-P52 computed in the shortest path first algorithm do not include the one of the connection ports P11-P52 of which the average data rate is in excess of the congestion criteria. Through such an arrangement, the controller 100 can acquire a new transmitting path, so that the packet flow with the highest data rate mentioned above is transmitted along the new transmitting path.

For example, under a condition, in the network system 10, a packet flow (N1, N2) and another packet flow (N5, N2) pass through the connection port P32 at the same time. The source address of the packet flow (N1, N2) is the node N1, and the destination address thereof is the node N2. The packet flow (N1, N2) is transmitted along a path N1→N3→N2. The source address of the packet flow (N5, N2) is the node N5, and the destination address thereof is the node N2. The packet flow (N5, N2) is transmitted along a path N5→N3→N2. When the searched average data rate of the connection port P32 is in excess of the congestion criteria, the controller 100 can search the packet flow with the higher data rate from the packet flow (N1, N2) and the packet flow (N5, N2), for example, being the packet flow (N1, N2). Afterwards, the controller 100 can perform the shortest path first algorithm to acquire a new transmitting path, for example N1→N4→N2. As suck the controller 100 make the packet flow (N1, N2) with the highest data rate in the original connection port P32 be transmitted in the new transmitting path, so as to prevent the connection port P32 from being congested or being kept in the congestion state.

In an embodiment, the congestion criteria may correspond to the support rate of the connection ports P11-P52. For example, when the support rate of the connection port P32 is 100 MBps, the congestion criteria of the connection port P32 may be 100 MBps*80%=80 MBps.

Via the method above, when the average data rate of any one of the connection ports P11-P52 in the network system 10 is in excess of the congestion criteria, the packet flow with the highest data rate passing through the connection port can be forwarded to other paths. The occurrence of the congestion or the persistent congestion can therefore be prevented, so that the network system 10 can be kept stable and reliable.

The shortest path first algorithm mentioned above will be further described in the following paragraphs.

In an embodiment, the method for performing the shortest path first algorithm is as follows. The controller 100 searches a plurality of candidate paths for the packet flow with the highest data rate according to the packet flow with the highest data rate and the network topology diagram corresponding to the network system 10. The controller calculates path costs of the candidate paths, in which the path costs are the sum of the costs of the links in each of the paths, and then the controller searches one candidate path with the lowest path cost from the candidate paths as a new transmitting path for the packet flow with the highest data rate.

In another embodiment, the method for performing the shortest path first algorithm, for example, is that the controller 100 performs a Dijkstra algorithm for the packet flow with the highest data rate, so as to search a new transmitting path for the packet flow with the highest data rate. During the process of the Dijkstra algorithm, by removing the links L1-L6 corresponding to the connection ports P11-P52 of which the average data rates are in excess of the congestion criteria (for example, removing the link L3 corresponding to the connection port P32), the new transmitting path can be prevented from passing through the links L1-L6 corresponding to the connection ports P11-P52 of which the average data rates are in excess of the congestion criteria.

Furthermore, in an embodiment, when the average data rate of any one of the connection ports P11-P52 is in excess of the congestion criteria, the controller 100 can calculate the costs of the links L1-L6 according to the average data rates of the connection ports P11-P52 and the support rates of the connection ports P11-P52. The controller 100 performs the shortest path first algorithm for the packet flow with the highest data rate in which weights of the shortest path first algorithm can be the costs of the links, so as to search the new transmitting path for the packet flow with the highest data rate. During the process of the shortest path first algorithm, the controller 100 can exclude the links L1-L6 corresponding to the connection ports P11-P52 of which the average data rates are in excess of the congestion criteria, so that the new transmitting path does not pass through the links L1-L6 corresponding to the connection ports P11-P52 of which the average data rates are in excess of the congestion criteria. For example, during the performance of the shortest path first algorithm, the controller 100 can remove the links L1-L6 corresponding to the connection ports P11-P52 of which the average data rates are in excess of the congestion criteria or set the costs thereof as infinities.

Moreover in an embodiment, the method for calculating the costs of the links L1-L6 is as follows. The controller 100 subtracts the current average data rates from the support rates of the connection ports P11-P52 to acquire the residual data rates of the connection ports P11-P52. Next, the controller 100 divides the residual data rates of the connection ports P11-P52 by the support rates of the connection ports P11-P52, to acquire the costs of the links L1-L6 corresponding to the connection ports P11-P52.

Through the operation above, the packet flow with the highest data rate mentioned above can be rerouted to the new transmitting path with the lowest cost, so that the data rate in the network system 10 is evenly distributed.

The monitoring of the average data rates of the connection ports P11-P52 will be further described in the following paragraphs.

In an embodiment of the present invention, the nodes N1-N5 can store statistical data. The statistical data may include the cumulative data (for example, received bytes of each port in an OpenFlow table) of the connection ports P11-P52. The controller 100 can periodically receive the cumulative data of one of the connection ports P11-P52. The controller 100 can divide the difference between the newest received cumulative data of the one of the ports P11-P52 and the secondarily newest received cumulative data of the one of the ports P11-P52 by the time interval between the receipts of the two cumulative data, to acquire the current average data rate of the one of the connection ports P11-P52.

For example, the controller 100 can receive the first cumulative data of one of the connection ports P11-P52 at a first time point (for example, at the $0^{th}$ second moment). After a preset period (for example, 30 seconds), the controller 100 can receive the second accumulative data rate of the one of the connection ports P11-P52 at a second time point (for example, at the $30^{th}$ second moment). Subsequently, the controller 100 can divide the difference between the first cumulative data and the second cumulative data of the one of the connection ports P11-P52 by the difference between the first time point and the second time point, to acquire the average data rate of the one of the connection ports P11-P52.

The details of transmitting the packet flow with the highest data rate in the new transmitting path will be further described in the following paragraphs.

In an embodiment of the present invention, the nodes N1-N5 may each include a forwarding table (e.g., OpenFlow flow table), to store zero or more packet forwarding rules (e.g., OpenFlow flow entries). The nodes N1-N5 can forward the packets according to these packet forwarding rules. Furthermore, for each of the packet forwarding rules, the cumulative data and the transmission time (e.g., duration in the OpenFlow flow table) thereof can be recorded respectively. Via the setting above, among each of the nodes N1-N5, one or more packet forwarding rules in the forwarding table may each correspond to one or more packet flows passing through the node. The packet flow with the highest data rate can, for example, refer to, but not limited to, the one of the packet forwarding rules of which has the largest value acquired through dividing the cumulative data by the transmission time.

After searching the packet flow with the highest data rate, the controller 100 can search the source node and the destination node of the packet flow with the highest data rate according to the packet forwarding rule corresponding to the packet flow with the highest data rate. Subsequently, according to the source node and the destination node of the packet flow with the highest data rate, the controller 100 can acquire an original path passed by the packet flow with the highest data rate by making comparison among the forwarding tables of all the nodes N1-N5.

After acquiring the new transmitting path, the controller 100 can write the corresponding packet forwarding rules into the forwarding tables of the nodes N1-N5 passed by the new transmitting path according to the new transmitting path. Moreover, the packet forwarding rule corresponding to the original path is deleted from the forwarding tables of the nodes N1-N5 passed by the original path. As such, the packet flow with the highest data rate can be transmitted in the new transmitting path.

Another implementing aspect of the present invention provides a load balancing method. The load balancing method can be applied to a network system having the same or similar structure as that in FIG. 1. For the convenience of description, the following operation method is described by taking the embodiment shown in the FIG. 1 as an example, but the following operation method is not limited to that.

It should be noted that the steps of the following operation method are not specifically sequenced, unless otherwise specified. Additionally, the following steps also may be executed at the same time, or the execution time thereof is overlapped.

Figure 2:
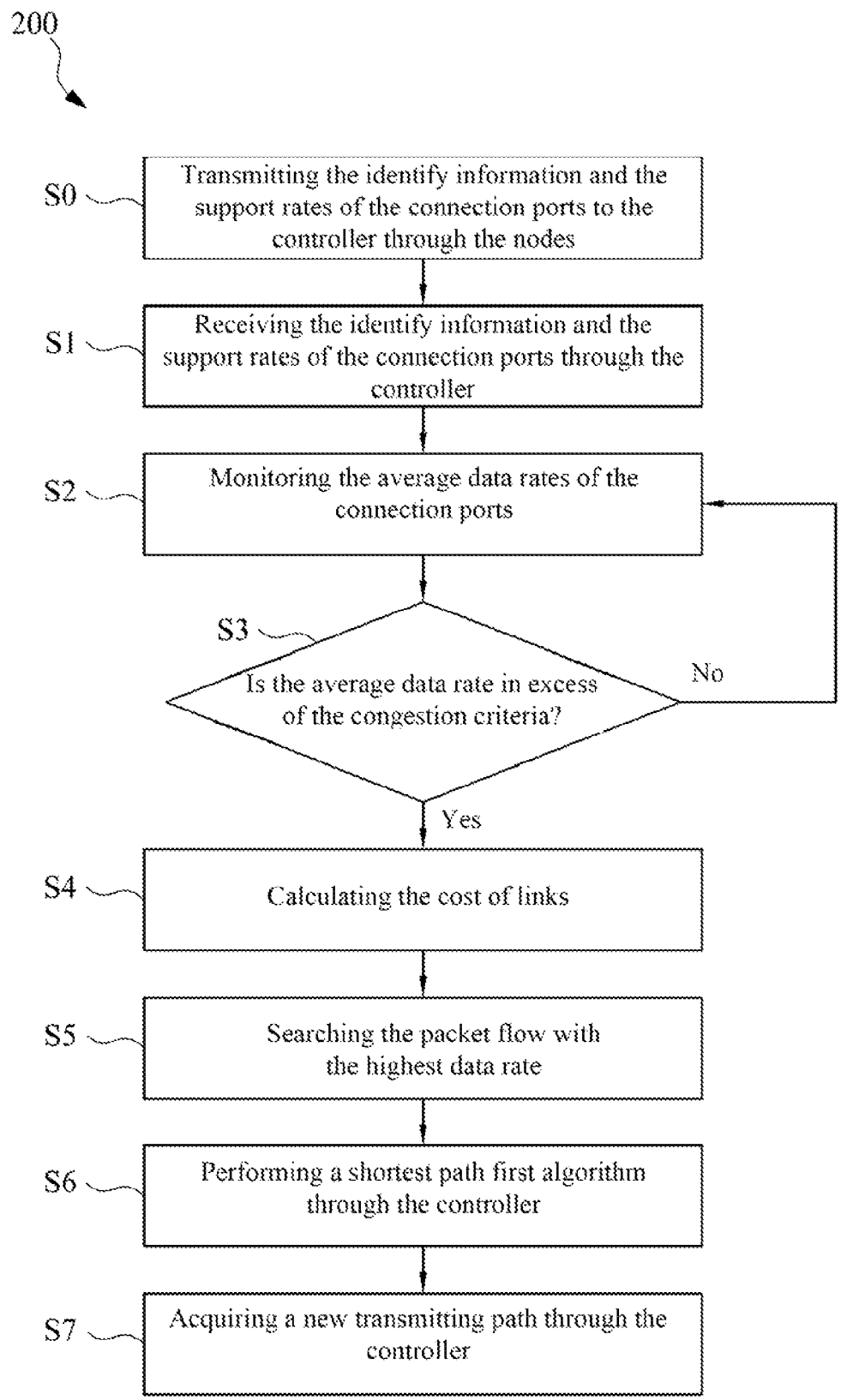
FIG. 2 is a flow chart of a load balancing method illustrated according to an embodiment of the present invention.

FIG. 2 shows a load balancing method 200 illustrated according to an embodiment of the present invention. The load balancing method 200 may includes steps S0-S7.

In the step S0, the nodes N1-N5 can transmit the identify information and the support rates of the connection ports P11-P52 of the nodes N1-N5 to the controller 100. In the step S1, the controller 100 can receive the identify information of the nodes N1-N5 transmitted by the nodes N1-N5 to construct the network topology diagram corresponding to the network system 10 and receive the support rates of the connection ports P11-P52 transmitted by the nodes N1-N5. For example, the controller 100 can instruct the nodes N1-N5 to transmit the link layer discovery protocol (LLDP) packet to the adjacent nodes N1-N5, so that the adjacent nodes N1-N5 exchange the identify information of themselves. Next, the controller 100 can send another instruction to the nodes N1-N5 to make the nodes N1-N5 pass the identify information of the adjacent nodes N1-N5 back to the controller 100. In this way, the controller 100 can know the network topology diagram corresponding to the network system 10 via the identify information of the nodes N1-N5. Also, the controller 100 can make the nodes N1-N5 pass back the support rates of the connection ports P11-P52 by sending the instruction to the nodes N1-N5.

In the step S2, the controller 100 can monitor the average data rates of the connection ports P11-P52. For example, the controller 100 can periodically send the instruction to the nodes N1-N5 to make the nodes N1-N5 transmit the cumulative data of the connection ports P11-P52 to the controller 100. The controller 100 then calculates the average data rates according to the cumulative data.

In the step S3, the controller 100 can determine whether the average data rate of any one of the connection ports P11-P52 is in excess of the congestion criteria. If not, the controller 100 continues to monitor the average data rates of the connection ports P11-P52. If so, the controller 100 can calculate the costs of the links L1-L6 according to the average data rates of the connection ports P11-P52 and the support rates of the connection ports P11-P52 (step S4). Furthermore, the controller searches a packet flow with the highest data rate from the packet flows passing through the connection ports P11-P52 (step S5). It should be noted that the step S4 and the step S5 are not specifically sequenced. In addition, the congestion criteria may correspond to the support rates of the connection ports P11-P52. Moreover, the related details of the packet flow and the packet flow with the highest data rate mentioned above can be known by referring to the previous implementing aspect, which are not described herein again.

Next, in the step S6, the controller 100 can perform the shortest path first algorithm according to a packet flow with the highest data rate and the network topology diagram corresponding to the network system 10. The connection ports P11-P52 computed in the shortest path first algorithm do not include the connection ports P11-P52 of which the average data rates are in excess of the congestion criteria. With such a setting, the controller 100 can acquire a new transmitting path (step S7) so that the packet flow with the highest data rate can be transmitted along the new transmitting path.

According to an embodiment of the present invention, in the step S6, the method for performing the shortest path first algorithm is as follows. The controller searches a plurality of candidate paths for the packet flow with the highest data rate according to the packet flow with the highest data rate and the network topology diagram corresponding to the network system 10. The controller calculates path costs of the candidate paths. Next, the controller searches one candidate path with the lowest path cost from the candidate paths as a new transmitting path for the packet flow with the highest data rate.

For example, the controller 100 can sum up the costs of the links L1-L6 passed by each of the candidate paths to calculate the total cost of these candidate paths as the path costs. Subsequently, the controller 100 searches one candidate path with the lowest cost from these candidate paths as the new transmitting path for the packet flow with the highest data rate mentioned above.

According to another embodiment of the present invention, the method for performing the shortest path algorithm as follows. The controller 100 performs the Dijkstra algorithm for the packet flow with the highest data rate mentioned above based on the costs of the links L1-L6 as the weights to search the new transmitting path for the packet flow with the highest data rate. During the process of the Dijkstra algorithm, by removing the links L1-L6 corresponding to the connection ports P11-P52 of which the average data rates are in excess of the congestion criteria or by setting the costs as the infinities, the new transmitting path can be prevented from passing through the links L1-L6 corresponding to the connection ports P11-P52 of which the average data rates are in excess of the congestion criteria.

Moreover, the method for calculating the costs of the links L1-L6 is as follows. The controller 100 can subtract the current average data rates from the support rates of the connection ports P11-P52 to acquire the residual data rates of the connection ports P11-P52. Next, the controller 100 can divide the residual data rates of the connection ports P11-P52 by the support rates of the connection ports P11-P52, to acquire the costs of the links L1-L6 corresponding to the connection ports P11-P52.

Via the method above, when the average data rate of any one of the connection ports P11-P52 in the network system 10 is in excess of the congestion criteria, the packet flow with the highest data rate passing through the connection port can be forwarded to the new transmitting path with the lowest cost. As such, the occurrence of the congestion or the persistent congestion is prevented, resulting in that the data rate in the network system 10 is evenly distributed. Therefore, the network system 10 can be kept stable and reliable.

It should be noted that the step mentioned above (S4) of calculating the costs of the links L1-L6 can enable the controller 100 to perform the shortest path first algorithm according to the costs of the links, so that the new transmitting path has the lowest cost. However, in some embodiments, the controller 100 can perform the shortest path first algorithm according to other parameters (for example, the support rates of the connection ports P11-P52). Under these cases, the step S4 can be omitted.

In an embodiment of the present invention, in the step S2, the controller 100 can periodically receive the cumulative data of the connection ports P11-P52 of the nodes N1-N5. Moreover, the controller 100 divides the difference between the newest received cumulative data and the secondarily newest received cumulative data by the time interval between the receipts of the two cumulative data, so as to acquire the current average data rates of the connection ports P11-P52. For example, the controller 100 can receive the first cumulative data of the connection ports P11-P52 of the nodes N1-N5 at a first time point (for example, at the $0^{th}$ second moment). After a preset period (for example, 30 seconds), the controller 100 can receive the second cumulative data of the connection ports P11-P52 of the nodes N1-N5 at a second time point for example, at the $30^{th}$ second moment). Subsequently, the controller 100 can divide the difference between the first cumulative data and the second cumulative data of the connection ports P11-P52 by the difference between the first time point and the second time point, to acquire the average data rates of the connection ports P11-P52. It should be noted that the preset time corresponds to the frequency of receiving the cumulative data of the connection ports P11-P52 through the controller 100. The preset time can be adjusted according to implementation situations, but is not limited by the embodiments mentioned above.

Furthermore, in an embodiment of the present invention, the load balancing method 200 may further include the following steps. After searching the packet flow with the highest data rate, the controller 100, for example, searches the source node and the destination node of the packet flow with the highest data rate according to the packet forwarding rule corresponding to the packet flow with the highest data rate. Subsequently, according to the source node and the destination node of the packet flow with the highest data rate, the controller 100 can search an original path for the packet flow with the highest data rate through the comparison among the forwarding tables of all the nodes N1-N5. The related details of the forwarding tables and the packet forwarding rules can be known by referring to the previous embodiment, which is not described herein anymore.

After acquiring the new transmitting path, the controller 100 can the corresponding packet forwarding rule into the forwarding tables of the nodes N1-N5 passed by the new transmitting path according to the new transmitting path. Moreover, the packet forwarding rule corresponding to the original path is deleted from the forwarding tables of the nodes N1-N5 passed by the original path. As such, the packet flow with the highest data rate mentioned above can be transmitted along the new transmitting path.

Although the present invention has been disclosed with reference to the above embodiments, these embodiments are not intended to limit the present invention. It will be apparent to those skilled in the art that various modifications and variations can be made without departing from the scope and spirit of the present invention. Therefore, the scope of the present invention shall be defined by the appended claims.

What is claimed is:

1. A load balancing method of a network system, wherein the network system comprises a plurality of nodes and a controller, wherein each of the plurality of nodes comprises at least one connection port, every two adjacent nodes are connected through the connection ports to form a plurality of links, and the load balancing method comprises:

respectively transmitting identify information of the plurality of nodes and a support transmitting speed rate of the at least one connection port of the plurality of nodes to the controller through the plurality of nodes;

the controller receiving the identify information to construct a network topology diagram and receiving the support transmitting speed rate of the at least one connection port of the plurality of nodes;

monitoring an average data rate of the at least one connection port of the plurality of nodes through the controller;

when the average data rate of one of the at least one connection port of the plurality of nodes is in excess of a congestion threshold, searching a packet flow with the highest data rate among the plurality of packet flows passing through the at least one connection port of which the data rate is in excess of the congestion threshold through the controller;

performing a shortest path first algorithm according to the packet flow with the highest data rate and the network topology diagram through the controller, wherein the computed connection ports do not include the connection port of which the average data rate is in excess of the congestion threshold; and acquiring a new transmitting path through the controller.

2. The load balancing method of claim 1, wherein the step of performing the shortest path first algorithm through the controller comprises:

searching a plurality of candidate paths for the packet flow with the highest data rate according to the packet flow with the highest data rate and the network topology diagram through the controller;

calculating path costs of the plurality of candidate paths through the controller; and searching one of the plurality of candidate path with the lowest path cost from the plurality of candidate paths through the controller.

3. The load balancing method of claim further comprising:

searching a source node and a destination node of the packet flow with the highest data rate, and an original path between the source node and the destination node through the controller;

writing at least one packet forwarding rule into at least one forwarding table of at least one of the nodes passed by the new transmitting path separately through the controller; and deleting at least one packet forwarding rule corresponding to the original path from at least one forwarding table of at least one of the nodes passed by the original path through the controller.

4. The load balancing method of claim 1, further comprising:

when the average data rate of one of the at least one connection port of the plurality of nodes is in excess of the congestion threshold, calculating costs of the plurality of links according to the average data rates of the at least one connection port of the plurality of nodes and the support transmitting speed rates of the at least one connection port of the plurality of nodes through the controller, wherein the step of performing the shortest path first algorithm through the controller according to the packet flow with the highest data rate and the network topology diagram comprises:

performing the shortest path first algorithm to plan out the new transmitting path through the controller, wherein weights of the shortest path first algorithm are the costs of the plurality of links.

5. The load balancing method of claim 1, wherein the step of monitoring the average data rates of the at least one connection port of the plurality of nodes comprises:

receiving a first cumulative data of one of the at least one connection port of one of the plurality of nodes at a first time point through the controller;

receiving a second cumulative data of the one of the at least one connection port of the one of the plurality of nodes at a second time point through the controller; and dividing the difference between the first cumulative data and the second cumulative data by the difference between the first time point and the second time point, so as to obtain one of the average data rates of the one of the at least one connection port of the one of the plurality of nodes through the controller.

6. A network system, comprising:

a plurality of nodes, wherein each of the plurality of nodes comprises at least one connection port; every two adjacent nodes are connected through the connection ports to form a plurality of links, the plurality of nodes are used for respectively outputting identity information of the plurality of nodes and a support transmitting speed rate of the at least one connection port of the plurality of nodes; and a controller used for receiving the identify information to construct a network topology diagram, receiving the support transmitting speed rates of the at least one connection port of the plurality of nodes, and monitoring an average data rates of the at least one connection port; wherein when the average data rate of one of the at least one connection port of the plurality of nodes is in excess of a congestion threshold, the controller searches a packet flow with the highest data rate from the plurality of packet flows passing through the at least one connection port of which the average data rate is in excess of the congestion threshold; the controller performs a shortest path first algorithm according to the packet flow with the highest data rate and the network topology diagram to acquire a new transmitting path; and the computed connection ports do not comprise the connection port of which the average data rate is in excess of the congestion threshold.

7. The network system of claim 6, wherein the controller is further used for searching a plurality of candidate paths for the packet flow with the highest data are according to the packet flow with the highest data rate and the network topology; calculating path costs of the plurality of candidate paths, and searching one of the plurality of candidate path with the lowest cost from the plurality of candidate paths as the new transmuting path.

8. The network system of claim 6, wherein the controller is further used for searching a source node and a destination node of the packet flow with the highest data rate, and an original path between the source node and the destination node; writing at least one packet forwarding rule into at least one forwarding table of at least one of the nodes passed by the new transmitting path separately; and deleting at least one packet forwarding rule corresponding to the original path from at least one forwarding table of at least one of the nodes passed by the original path.

9. The network system of claim 6, wherein when the average data rate of the at least one connection port of the plurality of nodes is in excess of the congestion threshold, the controller is further used for calculating the costs of the plurality of links according to the average data rates of the at least one connection port the plurality of nodes and the support transmitting speed rates of the connection ports and performing the shortest path first algorithm to plan out the new transmission path, wherein weights of the shortest path first algorithm are the costs of the plurality of links.

10. The network system of claim 6, wherein the controller is further used for receiving a first cumulative data of one of the at least one connection port of the plurality of nodes of one of the plurality of nodes at a first time point; receiving a second cumulative data of the at least one connection port of the one of the plurality of nodes at a second time point; and dividing the difference between the first cumulative data and the second cumulative data by the difference between the first time point and the second time point, so as to obtain one of the average data rates of the one of the at least one connection port of the one of the plurality of nodes.

* * * * *